United States Patent
Talley et al.

(10) Patent No.: US 9,353,609 B2
(45) Date of Patent: May 31, 2016

(54) METHOD AND COMPOSITION FOR REMEDIAL TREATMENT OF PARAFIN, ASPHALTENES, SCALE AND DEPOSITS IN OIL AND GAS INFRASTRUCTURE AND SUBTERRANEAN FORMATIONS

(75) Inventors: Charles Talley, Aurora, CO (US); Keith Weber, Lafayette, LA (US)

(73) Assignee: NW24 HOLDINGS, LLC, Brousard, LA (US)

( * ) Notice: Subject to any disclaimer, the term of this patent is extended or adjusted under 35 U.S.C. 154(b) by 627 days.

(21) Appl. No.: 13/464,787

(22) Filed: May 4, 2012

(65) Prior Publication Data

US 2015/0203739 A1 Jul. 23, 2015

Related U.S. Application Data

(63) Continuation-in-part of application No. 13/100,822, filed on May 4, 2011, now abandoned.

(60) Provisional application No. 61/330,955, filed on May 4, 2010, provisional application No. 61/353,675, filed on Jun. 11, 2010, provisional application No. 61/388,431, filed on Sep. 30, 2010.

(51) Int. Cl.
*E21B 43/16* (2006.01)
*C11D 3/39* (2006.01)
*C11D 11/00* (2006.01)
*C09K 8/524* (2006.01)
*C09K 8/528* (2006.01)

(52) U.S. Cl.
CPC .................. *E21B 43/16* (2013.01); *C09K 8/524* (2013.01); *C09K 8/528* (2013.01); *C11D 3/3942* (2013.01); *C11D 3/3947* (2013.01); *C11D 11/0041* (2013.01); *Y10T 428/13* (2015.01); *Y10T 428/31504* (2015.04)

(58) Field of Classification Search
CPC ........................................................ C09K 8/68
USPC .......................................... 510/434; 252/180
See application file for complete search history.

(56) References Cited

U.S. PATENT DOCUMENTS

| | | | | |
|---|---|---|---|---|
| 5,190,656 A | * | 3/1993 | Paul et al. ................. | 210/643 |
| 2008/0289827 A1 | * | 11/2008 | Welton et al. .............. | 166/300 |
| 2009/0120639 A1 | * | 5/2009 | Nguyen et al. ............. | 166/275 |
| 2009/0200033 A1 | * | 8/2009 | Kakadjian et al. ......... | 166/305.1 |

* cited by examiner

*Primary Examiner* — Gregory Webb
(74) *Attorney, Agent, or Firm* — G. Michael Roebuck, PC

(57) ABSTRACT

A method for treating a deposit is disclosed, wherein the deposit comprises a hydrophobic portion and an inorganic portion, the method including but not limited to contacting the deposit with a treating material to form a treated deposit, the treating material comprising peroxygen and surfactant and contacting the treated deposit with an acid. A product resulting from using the method is also disclosed.

18 Claims, No Drawings

METHOD AND COMPOSITION FOR REMEDIAL TREATMENT OF PARAFIN, ASPHALTENES, SCALE AND DEPOSITS IN OIL AND GAS INFRASTRUCTURE AND SUBTERRANEAN FORMATIONS

CROSS REFRENCE TO RELATED APPLICATIONS

The present application is a continuation in part of and claims priority from U.S. patent application Ser. No. 13/100,822 filed on May 4, 2011, entitled A Method and Composition for Remedial Treatment of Paraffin, Asphaltenes, Scale and Deposits in Oil and Gas Infrastructure by Charles Bullick Talley and Keith Weber, which is hereby incorporated by reference in its entirety and which claims priority from U.S. provisional patent application Ser. No. 61/330,955 filed May 4, 2010 entitled "A SYSTEM AND METHOD FOR WATER CLARIFICATION", by Charles Bullick Talley and Keith Weber; and claims priority from U.S. provisional patent application Ser. No. 61/353,675 file Jun. 21, 2010 entitled "A SYSTEM AND METHOD FOR MIXING" by Charles Bullick Talley and Keith Weber; and claims priority from U.S. provisional patent application 61/388,431 filed on Sep. 30, 2010 entitled "A SYSTEM AND METHOD FOR FLOW LINE CLEANING" by Charles Bullick Talley and Keith Weber, all of which are hereby incorporated by reference in their entirety.

FIELD OF THE INVENTION

The present invention relates to compositions, methods of making and using said compositions, and to products made from said compositions. More specifically, the present invention relates to compositions for treating paraffin's, asphaltenes, scale and general deposits in oil and gas infrastructures and hydrocarbon bearing subterranean formations. The present invention further relates to methods for making and using the composition and to treated deposits. Even more specifically, the present invention relates to compositions for treating the infrastructure and hydrocarbon bearing the subterranean formations, to methods of making and using the compositions, and to treated infrastructures and the subterranean formations. Still more specifically, the present invention relates to compositions for treating these deposits attached to the infrastructure and the subterranean formations, to methods of making and using the compositions, and to treated deposits and treated infrastructures and treated subterranean formations.

BACKGROUND OF THE DISCLOSURE

Hydrocarbon production infrastructure and facilities are subject to failure due to deposits. Deposits in the flow lines, well bores, formations, process equipment, pipelines, as well as other related equipment can reduce the ability of infrastructure to operate efficiently, and in a subterranean formation can effectively reduce affiance by plugging production flow paths. In extreme cases, deposits can render production infrastructure inefficient to the extent that the hydrocarbon production facility/infrastructure or oil/gas well is rendered useless. These deposits can consist of paraffin's, asphaltenes, heavy gravity oil, scale, hydrocarbon solids as well as other related deposits.

As oil and gas production moves to deeper and colder waters, deposits of paraffin and asphaltenes create multiple problems. These deposits can substantially reduce the inner diameter of piping restricting flow and ultimately blocking off the pipe. As this occurs, the increased interior surface roughness on the pipe wall also increases the pump pressure to move the petroleum product. The deposits will also accumulate in process vessels and storage tanks, necessitating intensive clean ups and disposal problems. The deposits can also interfere with valve operations and instrumentation. These problems are well documented in article entitled *Deep Water Technology Trends In Offshore Oil And Gas Operations* published in OIL WORLD November 2009 edition, which states:

> Wax deposits display only limited solubility at moderate temperatures in many types of organic solvents and are virtually insoluble in aqueous solutions, although they can be re-melted (at 120 to 150° F.)" It is also mentioned that "the most common removal methods are mechanical removal, heat applications, using hot oil or electrical heating, applications of chemicals, (e.g., solvents, pour-point dispersants), and the use of microbial products.

In today's economy, hydrocarbons are invaluable. They are used for fuel, lubricants and most plastics. As hydrocarbon prices have risen, many attempts have been made to increase hydrocarbon flow rates from oil and gas facilities as well as oil/gas wells and formations with paraffin/asphaltenes and scaling problems. Substantially all prior known treatments to remove these deposits have involved the use of solvents. It has been the practice to use solvents because it was believed that only hydrocarbon materials are effective in removing deposits. *Deep Water Technology Trends In Offshore Oil And Gas Operations*.

One typical treatment practice is to heat a combination of diesel oil or a blend of aromatic or aliphatic solvent, or a combination of both to temperatures above 130° F. and inject it into lines or a pipe carrying hydrocarbons. It is well known that in laboratory experiments, this procedure will dissolve most paraffin and asphaltenes deposits. The key in using this technique is the heat and not only the solvent, because when this procedure is used in sub-sea removal operations, it is effectiveness can be limited due to the massive temperature drop. This is true for Xylene, Toluene, and other similar aromatic solvents; heat of some type is always required to do a thorough removal of deposits. This poses a need for an alternate and/or combination treatment described herein to not only enhance performance of the treatments, but to also reduce treatment costs. Some prior applications heat was required for the solvent to work. In using heat, there exists the potential for removing only the parts that are soluble in the solvent, not the whole plug which can make the plug harder to dissolve. In some cases the use of solvents and current chemical treatments are less effective as some chemicals reach cloud point and fall out before doing their work.

Acids are also used to remove scale that is deposited from the varying types of produced water that accompanies oil and gas production, however, aqueous systems to treat any type of processing equipment is typically used as a last resort. The separate handling and disposal of aqueous systems is problematic, as well as the disposal problems associated with chemically treated water has in the past been a major problem especially in offshore operations where disposal of produced water has to meet high standards to be disposed of. Acids have a very difficult time in actually dissolving mineral scale when crude oil is present. Due to this fact it has been a hit or miss proposition when using acid to remove mineral scale deposits.

SUMMARY OF THE DISCLOSURE

In a particular non limiting illustrative embodiment, a method is disclosed for treating a deposit, wherein the deposit comprises a hydrophobic portion and an inorganic portion, the method including but not limited to contacting the deposit with a treating material to form a treated deposit, the treating material comprising peroxygen and surfactant.

In another non limiting illustrative embodiment, the method for treating a deposit further includes but is not limited to contacting the treated deposit with an acid. In another non limiting illustrative embodiment, the treatment material may further include but is not limited to a silicate. In another embodiment of the method for treating a deposit, the inorganic portion may be a metal salt. In another embodiment of the method for treating a deposit, the metal salt may be a metal sulfate. In another embodiment of the method for treating a deposit, the metal sulfate may be calcium, barium sulfate, or strontium sulfate. In another embodiment of the method for treating a deposit, the deposit is at least a portion of the inorganic portion and may be entrained within the hydrophobic portion. In another embodiment of the method for treating a deposit, the acid may be selected from the group consisting of HCl, HBr, $HNO_3$, $H_2SO_4$, and $H_3PO_4$, citric acid, oxalate acid, organic acid salts, and mixtures of the foregoing.

In another particular non limiting illustrative embodiment, a method is disclosed for treating oil and gas infrastructure, wherein the infrastructure supports a deposit, the deposit including but not limited to a hydrophobic portion and an inorganic portion, the method including but not limited to contacting the deposit with a treating material to form a treated deposit, the treating material including but not limited to peroxygen and surfactant. In another particular non limiting illustrative embodiment, the method for treating oil and gas infrastructure further includes but is not limited to contacting the treated deposit with an acid.

In another particular non limiting illustrative embodiment, a method is disclosed for treating oil and gas infrastructure having a deposit therein, the method including but not limited to introducing a treating material to the infrastructure, wherein the treating material includes but is not limited to peroxygen and surfactant. In another particular non limiting illustrative embodiment a product is disclosed including but not limited to a tank having a deposit therein; and a treating material, wherein the treating material includes but is not limited to a peroxygen and surfactant. In another particular non limiting illustrative embodiment of the tank product, the treating material further comprises acid. In another particular non limiting illustrative embodiment a product is disclosed, the product including but not limited to a pipe having a deposit therein and a treating material, wherein the treating material includes but is not limited to peroxygen and surfactant. In another particular non limiting illustrative embodiment of the pipe product, the treating material further comprises acid. In another particular non limiting illustrative embodiment of the pipe product, the deposit further comprises a hydrophobic portion and an inorganic portion and wherein the deposit is in contact with the pipe, and the treating material is in contact with the deposit. In another particular embodiment of the method, the treating material is introduced to a subterranean formation. In another particular non limiting illustrative embodiment a product is disclosed, the product including but not limited to a subterranean formation having a deposit therein and a treating material, wherein the treating material includes but is not limited to peroxygen and surfactant.

DETAILED DESCRIPTION

While not wanting to be limited by theory, it is believed that as the crystals dissolve, energy is released and this energy comes from the hydration of the surfactants that have been stored. When the crystals go into solution this energy is released. The other energy is the sodium per-carbonate releasing its oxygen. All of this chemical energy is actually chemical heat that starts circular reactions observed with the up and down motion of the hydrocarbons. It has been noted that the choice of surfactants is extremely important for the different applications. The choice of surfactants is determined by their individual HLB (Hydrophobic Lipophilic Balance). In some applications it is preferable to have surfactants with a high HLB to de-emulsify the system as in subterranean, cleaning, and down hole stimulation applications. This de-emulsifying is desirable to reduce or substantially eliminate any emulsion pad and provide a clean oil water break. In other applications it is preferable to have a low or HLB to emulsify and bring reacted hydrocarbons into solution. This lower HLB is beneficial when removing paraffin and asphaltenes from sub-sea pipe lines, in mineral scale removal, and in some cleaning applications. Once the alkaline materials have been dissolved in predetermined amounts, the selected HLB surfactant package will begin to work.

In either case the surfactant package is designed to work in either hot or cold temperatures. The surfactant package will preferably have an effective pH range of between 2 and 14 and most effective in the range of 8 to 11. The average dyne interfacial tension of the working solution will be between 24 and 45. Preferably the average dyne interfacial tension of the working solution range is about 28 to 35. The selection of the surfactant package is designed to penetrate asphaltenes allowing the oxygen portion to break double bonds and to help in the creation of simple soaps. Once the simple soaps have been formed the simple soaps will coat paraffin and reduce or substantially eliminate stickiness associated with treated deposits. This combination of surfactants and oxygen has proven to be very effective in penetrating very large deposits of paraffin and asphaltenes as a cold solution or as a hot solution. The end result in either case is a mass that is not sticky and is easy to pump and be removed from pipe used for transporting hydrocarbons. This same reaction of removing asphaltenes has also been demonstrated in the removal of trapped oil in mineral scale deposits. Once the product is introduced to these mineral scale deposits, the oil is lifted leaving behind a number of very active cites that acid treatments can attack. The surfactants typically start taking effect in about 20 minutes. HLB is a measurement of the ability of the product to bring oil into solution of paraffin or asphaltenes depending on the composition of the oil sludge to which it is applied. As the HLB works, the paraffin will break into small pieces away from the paraffin deposit and if the oxygen is working properly the small pieces of the paraffin will be capped and thus not allow the small paraffin pieces to come back on the paraffin deposit so that the paraffin particles become able to be pumped out of the pipe and away from the paraffin deposit. On the scale sample it has been observed that the scale cleaning up the oil is removed. Then "dirt' or the small pieces of paraffin and scale can be observed falling off the scale sample that is removing the oil and freeing small amounts of scale. Once this removal is started, cracks in the scale appear which is the beginning of large pieces of scale to either slough off or become susceptible to an acid attack.

Another particular non-limiting illustrative embodiment of the present invention is directed generally to reduce the quantity used of hydrocarbon solvents and various applications using solvents. In a first embodiment, a method includes but is not limited to contacting the liquid additive composition with a hydrocarbon-containing material to dissolve hydrocarbons in the hydrocarbon-containing material and form a hydrocarbon-containing liquid additive composition. The liquid additive composition includes but is not limited to a peroxygen composition, a surfactant, and at least about 20 wt. % alkalis. The additive composition can further include one or more of the following: a silicate (such as, but not limited to a metasilicate or sesquisilicate); and a chelator. The alkali content is preferably provided by a builder (such as, but not limited to sulfates, carbonates, and sesquicarbonate). The peroxygen composition can be any peroxygen composition, such as, but not limited to hydrogen peroxides, persulfates, thiourea dioxides, percarbonates, perborates, diethylhydroxylamines, persulfates, and peracetic acids, more preferred are perborates and percarbonates. The additive composition is solubilized into one of an aqueous liquid, a non-aqueous liquid, or a mixture thereof. Non-limiting illustrative examples of non-aqueous liquids include but are not limited to methanol, ethanol, Butanol, t-butanol, and ethanolamine. Non-limiting illustrative examples of aqueous liquids include but are not limited to: water, aqueous brines; sea, lake and/or river waters; subsurface waters, or mixtures thereof.

In a second non-limiting illustrative embodiment, the additive composition is a mixture that includes but is not limited to: (a) a peroxygen composition; (b) a surfactant; (c) a chelate; (d) a silicate; and (e) dissolved hydrocarbons. In a third embodiment, the additive composition is a liquid mixture that includes but is not limited to: (a) one or more low HLB surfactants; (b) one or more high HLB surfactants; (c) one or more peroxygen compositions, (d) dissolved hydrocarbons, wherein at least one of the following is true for the mixture an oxidation potential of at most about; a surface tension of at most about 30 dynes; and an $Na_2O$ meq value at a pH of about pH 11 of at least about 20 meq. The mixture is commonly formed when the additive composition is contacted with a hydrocarbon-containing material. Another aspect of the present invention is a method of using the additive composition. Another illustrative embodiment of the method includes but is not limited to a method of using the additive composition in a petroleum production process. Additional non-limiting illustrative examples of using the additive composition in petroleum production are: additive and/or stimulating a petroleum-containing material; additive and/or stimulating a petroleum-producing well; recovering petroleum from the petroleum-containing material; and additive petroleum production and/or transporting equipment. Petroleum means any hydrocarbon-composition or mixture of hydrocarbon-compositions, including but not limited to: crude oil (heavy, intermediate, and light grades); shale oil; and/or tar.

The above embodiments can provide a number of advantages. For example, the additive composition and methods can liquefy asphaltenes and coat paraffin rendering them not sticky. The composition can also remove clogging caused by metal carbonate and sulfate deposits. The mixture formed from the composition and dissolved hydrocarbons can produce a cleaner split of produced water and hydrocarbons. Typically, produced water includes about 3 wt. % hydrocarbons. The additive composition can reduce significantly the amount of hydrocarbons in the recovered produced water.

These and other advantages will be apparent from the disclosure of the invention contained herein. An "alkali" refers to any composition that has highly basic properties. Alkalis are often hydroxides of alkali metals (metals that belong to Group IA of the periodic table, including lithium ($Li^{+1}$), sodium ($Na^{+1}$), potassium ($K^{+1}$), rubidium ($Rb^{+1}$), cesium ($Cs^{+1}$), and francium ($Fr^{+1}$). Alkalis are strong bases that turn litmus paper from red to blue; they react with acids to yield neutral salts; and they are caustic and in concentrated form and are corrosive to organic tissues. The term alkali is also applied to the soluble hydroxides of such alkaline-earth metals as calcium, strontium, and barium and also to ammonium hydroxide.

For purposes of the present disclosure, the following definitions apply.

An "asphaltene" is a component of bitumen.

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B or C" and "A, B, and/or C" means A alone, B alone, C alone, A and B together, A and C together, B and C together, or A, B and C together.

"Bitumen" is a mixture of hydrocarbons.

A "builder" is a substance added to soaps or detergents to increase their cleansing action.

A "chelate" is a type of coordination composition in which a central metal ion, such, $Ca^{+2}$, $Mg^{+2}$, $Fe^{+2}$, $Fe^{+3}$, $Cu^{+2}$, $Pb^{+2}$, $Mn^{+2}$, $Ni^{+2}$ or, $Zn^{+2}$ is attached by coordinate links to two or more nonmetal atoms in the same molecule, called ligands. Heterocyclic rings are formed with the central (metal) atom as part of each ring. Ligands offering two groups for attachment to the metal are termed bidentate (two-toothed); three-groups tridentate; etc. A common chelating agent is ethylene-diaminetetraacetic acid, N-hydroxyethyl-enediaminetriacetic acid, (poly) alkylphosphonic acid, Nitrilotriacetic acid, and ethyleneglycol-bis (.beta.-aminoethyl ether)-N, N-tetra acetic acid.

"Crack" refers to the thermal decomposition of a substance, such as the thermal decomposition of crude petroleum, to produce petrol/gasoline.

"Dissolve" refers to the formation of a solution from two or more substances. Typically, the solution is a homogeneous mixture composed of the two or more substances. In such a mixture, a solute is dissolved in another substance, known as a solvent.

A "hydrocarbon" is an organic composition exclusively including elements of carbon and hydrogen. The principal types of hydrocarbons include aliphatic (straight-chain) (which includes paraffins or alkanes, olefins, alkenes, alkalidienes, acetylenes, and acyclic terpenes) and cyclic (closed ring) (which includes alicyclic (cycloparaffins, cycloolefins, and cycloacetylenes), aromatic (which includes the benzene group, naphthalene group, and anthracene group), and cyclic terpenes.

"HLB" (Hydrophile-Lipophile Balance) is an empirical expression for the relationship of the hydrophilic ("water-loving") and hydrophobic ("water-hating") groups of a surfactant.

"Kerogen" is an organic composition of oil shale and is normally a mixture of aliphatic and aromatic compositions of humic and algal origin.

"Oil" is applied to a wide range of substances and can be classified by type and function. The primary classification discussed herein is mineral (petroleum (aliphatic or wax-base, aromatic or asphalt-base, and mixed base) and petroleum-derived).

A "paraffin" is a class of aliphatic hydrocarbons characterized by a straight or branched carbon chain.

A "peroxygen composition" is a composition comprising the peroxide ion. The peroxide ion is an oxygen-containing ion in which the two atoms of oxygen are linked by a single bond.

"Solubility" refers to the state or quality of being soluble, capability of being melted or dissolved; amount of a substance that can be dissolved in a solvent.

"Solubilize" refers to making soluble or increasing solubility.

"Soluble" means the degree to which a substance dissolves in a solvent to make a solution (usually expressed as grams of solute per liter of solvent). Solubility of one fluid (liquid or gas) in another may be complete (totally miscible; e.g., methanol and water) or partial (oil and water dissolve only slightly).

A "surfactant", or surface-active agent, is any composition that reduces surface tension when dissolved in water or water solutions or which reduces interfacial tension between two liquids or between a liquid and solid. There are generally three categories of surface-active agents, namely detergents, wetting agents, and emulsifiers.

An "exothermic reaction" is a chemical reaction that is accompanied by the release of heat. In other words, the energy needed for the reaction to occur is less than the total energy released. As a result of this, the extra energy is released, usually in the form of heat. The absolute amount of energy in a chemical system is extremely difficult to measure or calculate. Often, the reaction occurs at the molecular level, therefore the change in energy is difficult to measure with standard equipment.

The above-described embodiments and configurations are neither complete nor exhaustive. As will be appreciated, other embodiments of the invention are possible utilizing, alone or in combination, one or more of the features set forth above or described in detail below.

In another particular embodiment, an additive composition is formulated (also referred to herein as Force Reaction Flow) (hereinafter referred to as "FRF") that is a blend of mined alkali salts as well as chelators and biodegradable surfactants. This additive composition combination has a number of benefits in the removal of paraffin and asphaltenes found in pipelines, storage tanks, production facilities, well bores, and intermediate subterranean well bore formations. For FRF to be effective in the removal of these materials without the use of hydrocarbons such as kerosene, or high aromatic solvents, a number of reactions take place. Substantially all of the hard water slats in the produced water are chelated as well as any salt formations found in the paraffin/asphaltenes deposits, the paraffin is capped so it will not form wax plugs and double bonds are broken so that the asphaltenes will flow.

A first reaction which takes place in using the method and composition is an endothermic reaction. Chelation starts and seeks all heavy metals and begins to attack the hard water scale formations found in the pipe lines and associated infrastructure. These reactions create a chemical heat on the molecular scale (referred to as latent heat). This chelation is through ion exchange, a calcium ion is taken out of solution and then it is replaced with sodium. In a particular embodiment, a 5% solution of the composition, FRF can chelate over 2,500 ppms of calcium.

A second reaction which takes place is an exothermic reaction. This mild saponification reaction is the beginning of the solubilizing process of asphaltenes. In this process a sodium ion is attached or bonded to the organic material, making the sodium ion slightly water soluble. Once again, in this process, heat is generated on an elemental scale which is an acid base reaction. It has been discovered that in many instances, paraffin plugs are created by the micro crystalline waxes used in inhibitors to prevent the paraffin's in the oil production from precipitation and deposition. The use of the alkali is used to at least partially break these micro crystalline bonds and let the paraffin begin to flow out of the pipe.

The FRF will also attack the double and triple bonds found in asphaltenes and hydrocarbons in general, the alkali and oxidizing agents will at least partially break these bonds. Once these bonds are broken (which also creates latent heat); the end result normally yields light ends ($C_1$ through $C_6$), and the remainder are shorter carbon chains. This reaction will continue for up to 7 days. It has been found that if allowed to remain in a pipeline for seven days, asphaltenes and paraffin's can be completed capped into a very fluid state. This state will vary for a material that appears to be normal oil to a material resembling liquid car wax.

All of these reactions are chemical in nature and are really not measured through a major temperature rise. They all take place on an atomic level and are violent reactions but are cool to the touch. This helps when doing sub-sea cleaning because external heat is not required for these reactions to take place. In the event there is external heat applied, the reactions are naturally more vigorous and are sped up.

The additive composition, when dissolved in a solvent such as water, has certain properties for enhanced results. Preferably, the surface tension of the additive composition is at most about 35 dynes, preferably at most about 30 dynes, and more preferably at most about 28 dynes. Preferably, the additive composition has a sufficient amount of surfactants and alkalis to maintain paraffins and asphaltenes in suspension. In one formulation, the additive composition preferably comprises at least about 20 wt. % alkalis, even more preferably at least about 30 wt. %, and even more preferably from about 30 to about 40 wt. % alkalis and has a pH of at least about pH 11 and even more preferably ranging from about pH 12.5 to about pH 13. The additive composition commonly has a $Na_2O$meq value of preferably at least about 20 meq at a pH of about pH 8, more preferably about at least 25 meq, and even more preferably a $Na_2O$ meq value of least about 30 meq at a pH of about pH 8. In one formulation, the additive composition has a $Na_2O$ meq value at a pH of about pH 4 preferably of at least about 25 meq, more preferably about at least 35 meq, and even more preferably a $Na_2O$ meq value at a pH of about pH 4 of least about 40 meq.

In one embodiment, the additive composition is the composition described in U.S. Pat. Nos. 6,043,207, with an issue date of Mar. 28, 2000, entitled "Non-Caustic Additive Comprising Peroxygen Composition, Meta/Sesqui-Silicate, Chelate and Method of Making the Same in Free-Flowing, Particulate Form" and U.S. Pat. No. 6,194,367, with an issue date of Feb. 27, 2001, entitled "Non-Caustic Additive Comprising Peroxygen Composition and Specific Silicate and Method of Making the Same in Free-Flowing Particulate Form" both to Talley, each of which is incorporated fully herein by this reference in their entirety. In these patents, hereinafter "the Talley patents" Talley teaches an alkaline additive for removing protein, grease, and other organic deposits and stains from articles such as those used in the food industry.

In this formulation, the additive composition preferably includes (a) a peroxygen composition, (b) a silicate, (c) a builder, (d) a surfactant, and (e) a chelate. Preferably, the additive composition is substantially free of chlorine-containing compositions and hydroxides. In a preferred embodiment, the silicate is a metasilicate and/or sesquisilicate. The composition may include a gelling agent. The additive composition is typically in a dry, granulated form which is dissolved in a carrier, such as water, to form a liquid additive composition before use.

While not wishing to be bound by any theory, the silicate is believed to carry the charge and maintain the surfactant in the aqueous solution. The builder is believed to provide sufficient alkalinity to peptize, emulsify, and/or saponify paraffins, asphaltenes, and other hydrocarbons. The chelate is believed to dissolve alkaline earth metals, particularly $Ca^{+2}$ in surrounding deposits and tie up dissolved metals, which would otherwise react with and neutralize the Ca$^{+2}$ (peroxide ion). The surface-active agent, or surfactant, is believed to provide enhanced penetration into the rock pores and fractures and cleave hydrocarbons.

The peroxygen composition preferably includes a hydrogen peroxide, persulfates, thiourea dioxide, perborates, percarbonate, diethylhydroxylamines, and/or peracetic acid and even more preferably a percarbonate. The peroxygen composition can be complexed with a metal, preferably an alkali or alkaline earth metal selected from the group including sodium, lithium, calcium, potassium, and boron. The additive composition preferably includes at least about 25% by weight, more preferably from about 25% to about 40% by weight, and even more preferably from about 25% to about 35% by weight of the peroxygen composition.

The silicate is preferably a metasilicate and/or sesquisilicate. The silicate is preferably in the anhydrous form and is normally in a composition with an alkali or alkaline earth metal. The alkali metal is preferably one or more of sodium and potassium The additive composition preferably includes at least about 15% by weight, more preferably from about 20% to about 40% by weight, and most preferably from about 25% to about 35% by weight of the silicate.

The builder can be any suitable builder. Preferably, the builder is one or more of a sulfate, carbonate, phosphate, and sesquicarbonate. The sulfate is, for example, an alkali or alkaline earth metal sulfate, with sodium sulfate being preferred. The phosphate is preferably a tripolyphosphate, trisodium polyphosphate, sodium potassium pyrophosphate, sodium hexametaphosphate, disodium phosphate, and/or monosodium phosphate. The carbonate is preferably one or more of an alkali or alkaline earth metal carbonate, sesquicarbonate, bicarbonate. When the additive composition includes a surfactant, the carbonate and phosphate are preferably in the hydrated form, such as Trona or soda ash. In one formulation, the builder comprises a phosphate in an amount ranging from about 5 to about 15 wt. % and even more preferably from about 7.5 to about 12.5 wt. %.

While not wishing to be bound by any theory, it is believed that the hydrated builders, such as the hydrated phosphates and/or carbonates, form bonds with the surfactants which are hydrophilic substances, thereby immobilizing the surfactant and water. As will be appreciated, the surfactant and water will react with the peroxygen composition unless the surfactant and water are immobilized. The reaction reduces and therefore neutralizes the peroxygen composition while causing the release of oxygen gas. The reaction not only adversely impacts the shelf life and hydrocarbon removal efficiency of the additive composition but also can cause a hazardous pressure build up from the released oxygen gas. The use of adequate amounts of hydrated builders has been found to substantially eliminate these problems.

The amount of hydrated builder in the additive composition normally depends upon the amount of surfactant in the additive composition. Preferably, the molar ratio of the hydrated builder to the surfactant is at least about 4 parts of hydrated builder to one part surfactant, more preferably ranges from about 6 to about 22 parts of hydrated builder to one part surfactant, and even more preferably ranges from about 8 to about 10 parts of hydrated builder to one part surfactant. The total amount of builder in the additive composition (both in the hydrated and anhydrous forms) varies depending upon the application. The additive composition preferably includes at least about 20 wt. % by weight, more preferably from about 20% to about 75% by weight, and even more preferably from about 25% to about 50% by weight of the builder.

It has been discovered that phosphate builders have several beneficial effects on the performance of the additive composition in addition to immobilizing the surfactant in water. The phosphate helps the chelate tie up free metals. In sufficient amounts of the phosphates, dry blending of the additive composition is much less difficult. Preferably, the additive composition contains from about 3% to about 15% by weight phosphates.

The additive composition can further include a surfactant. The surfactant should be functional in an alkaline solution. Suitable surfactants are nonionic, anionic and amphoteric surfactants.

Preferred nonionic surfactants include octylphenoxy-polyethoxy-ethanol (e.g. TRITON™ X-100), Nonyl phenoxy ethyleneoxy ethanol (e.g. IGEPAL™ CO730), nonylphenoxypoly(ethyleneoxy) ethanol (e.g. IGEPAL™ CO630), octylphenoxypoly(ethyleneoxy) ethanol (e.g. IGEPAL™ 630), poly-oxy ethoxylated ethanol (e.g. RENEX™ ZO), glycol fatty esters (e.g. HALLCO™ 376-N), fatty acid alkylanolamid (e.g. ALKAMIDE™ 2110), cetyldimethyl amine oxide (e.g. AMMONYX™ CO), aliphatic polyether (e.g. ANTAROX™ LF-344), polyethylenated alkyl glycol amide (e.g. ANTAROX™ G-200), fatty alcohol polyether (e.g. AROSURE™ 63-PE-16), polyoxyethylene sorbitol esters of mixed fatty and resin acids (e.g. ATLAS™ G-1234), modified oxyethylated straight-chain alcohol (e.g. RENEX™ 648), modified oxyethoxylated straight-chain alcohols (e.g. PLURAFAC™ RA-43), PO/EO block copolymer alcohols of propylene oxide (PO)ethylene oxide (EO) (e.g. PLURONIC™ 25-R-2), alkylaryl polyether (e.g. TRITON™ CF10), trifunctional polyoxyalkylene glycols (e.g., PLURADOT™ HA-410), Diethylene glycol dioleate, polyethylene glycol recinaleate, polyethylene glycol dioleate, tridecyl alcohol, nonylphenol, and ethylene oxide condensation products that are based on propylene oxide-propylene glycol (e.g. PLURONIC™ L-61), ethoxylated alkyl phenols (e.g. IGEPAL™ RC-620, ALKASURF™ OP-12, and TRITON™ N-101), propoxylated and ethoxylated fatty acids, alcohols, or alkylphenols (e.g., TRITON™ XL-80N and ANTAROX™ BL-330), ethoxylated alcohols (e.g. PLURAFAC™ A, TRITON™ CF-54, TERGITOL™-6, and TERGITOL™ 15-5-7), alkoxylated linear aliphatic alcohol (e.g. OLIN™ SL-42), and alcohol alkoxylate (e.g. SURFONIC™ LF-17). Preferred anionic surfactants include ethoxylated (3 moles) phosphate ester (e.g. TRITON™ QS-44), sodium sulfate of 2 ethyl-a-hexanol (e.g., sold under the trademark TERGITOL™ 08), sodium petroleum sulfonate (e.g. PETRONATE™ K), sodium alkyl naphthahalene sulfonate (e.g. PETRO™ AR, SELLOGEN™ K, NEKAL™ BX-78, ALKANOL™ B), primary alkane sulfonate (e.g. BIO TERG™ PAS-8S), dioctyl ester of sodium sulfosuccinic acid (e.g. ABRESOL™ OT), sodium alkylaryl sulfonate (e.g. AHCOWET ™ ANS), sodium salt of sulfated alkylphenoxy poly(ethyleneoxy) ethanol (e.g. ALIPAL™ EO-526), sodium methyl n-oleyl-taurate (e.g. AMATER™ G T), alkyl polyphosphate (e.g. ATCOWET™ C2), sodium lauryl sulfate (e.g. AVIROL™ 101), sodium N-methyl-N-tall oil acid taurate (e.g. IGEPON™ TK-32), lauricalkylo amine condensate (e.g. NOPCOGEN™ 14-L), fatty alcohol sulfate modified (e.g. RICHOLOL™ 4940), modified diethanolamides of fatty acids (e.g. SHERCOMID™), sulfates of alcohols (e.g. STANDOPAL™ LF), sulfonates of naphthalene and alkyl naphthalene (e.g. PETRO™ WP) and alkanolamides(e.g. NOPCO™ 1179), polyoxy ethylene tridecyl ether phosphate (e.g. RHODAFAC™ RS-610). Preferred amphoteric surfactants include disodium N-tallow beta minodipropionate (e.g. DERIPHATE™ 154), sodium derivative of dicarboxylic caprylic acid (e.g. MIRANOL™ J2M, letithin (e.g. CENTROL™ CA, LA), lauryl ampholytic (syndet) (e.g. SCHERCOTERIC BASE™ 156), carboxylic acid derivatives of substituted imidazolines (e.g. MONATERIC™), complex coco betaine (e.g. CARSONAM™ 3 AND 3147), fatty sulfobetaine (e.g., LONZAINE™ CS), dicarboxylic coconut derivative triethanolamine (e.g. MIRANOL™ TEA), dicarboxylic octoic derivative sodium salt (e.g. MIRANOL™ JEM), dicarboxylic myristic derivative diethanolamine (e.g. MIRANOL™ M2M-DEM), dicarboxylic myristic derivative monoethanolamine (e.g. MIRANOL™ M2M-MEA), dicarboxylic myristic derivative sodium salt (e.g. MIRANOL™ M2M-SF), dicarboxylic capric derivative diethanolamine (e.g. MIRANOL™ S2M-DEA), imidazolnes and imidazline derivatives (e.g. MONATERIC™ 949-J), dicarboxylic capric derivative triethanolamine (e.g., MIRANOL™ S2M-TEA), and other amphoteric surfactants (e.g., PHOSPHOTERIC™ T-C6).

Even more preferred surfactants include (i) the nonionic surfactants, nonylphenoxypoly(ethyleneoxy) ethanol (e.g. IGEPAL™ CO630), octylphenoxypoly(ethyleneoxy) ethanol (e.g. IGEPAL™ 630), ethoxylated alkylphenols (e.g. IGEPAL™ RC-620, ALKASURF™ OP-12, and TRITON™ N-101), propoxylated and ethoxylated fatty acids, alcohols, oralkyl phenols (e.g. TRITON™ XL-80N and ANTAROX™ BL-330), ethoxylated alcohols (e.g. PLURAFAC™ A, TRITON™ CF-54, TERGITOL™ 6, and TERGITOL™ 15-5-7), alkoxylated linear aliphatic alcohol (e.g. OLIN™ SL-42), Diethylene glycol dioleate, polyethylene glycol recinaleate, polyethylene glycol dioleate, tridecyl alcohol, nonylphenol, and ethylene oxide condensation products that are based on propylene oxide-propylene glycol (e.g., PLURONIC™ L-61), block copolymer alcohols (e.g. PLURONIC™ 25-R-2), and alcohol alkoxylate (e.g. SURFONIC™ LF-17); (ii) the anionic surfactants, primary alkane sulfonate(e.g. BIO TERG™ PAS-8S), sulfates of alcohols (e.g. STANDOPAL™ LF), sulfonates of naphthalene and alkyl naphthalene (e.g. PETRO™ WP), and alkanolamides (e.g. NOPCO™ 1179); and (iii) the amphoteric surfactants, imidazolnes and imidazline derivatives (e.g. MONATERIC™ 949-J), and the amphoteric surfactant PHOSPHOTERIC™ T-C6.

Even more preferred surfactants include the low foaming surfactants, primary alkane sulfonate BIO TERG™ PAS-8S, block copolymer alcohols (e.g. PLURONIC™ 25-R-2), and propylene oxide and ethylene oxide block polymer PLURONIC™ L-61 and the high foaming surfactants, nonylphenoxypoly(ethyleneoxy) ethanol IGEPAL™ CO 630 and octylphenoxypoly(ethyleneoxy) ethanol IGEPAL™ CA 630.

In another particular formulation, the additive composition comprises one or more low HLB surfactants and one or more high HLB surfactants. In another particular formulation, the low HLB surfactant is a surfactant having an HLB value less than about 12, preferably less than about 10, and more preferably less than about 8. Non-limiting examples of the low HLB surfactants are BioTerg™ PAS-85, having an HLB value of about 12, and Pluronic™ 25-R2, having an HLB of about 4. In another formulation, the high HLB surfactant is a surfactant having an HLB value greater than about 8, preferably greater than about 10, and more preferably greater than about 12. Non-limiting examples of the high HLB surfactants are Pluronic™ L-61, having an HLB value of about 16, and Tomadol™ 91-6, having an HLB value of about 12.5.

In one formulation, the additive composition includes preferably from about 0.01 to about 1.0 wt. % and even more preferably from about 0.05 to about 0.5 wt. % of a fluorocarbon surfactant sold by DuPont Capstone™ FS-51 to impart heat and pressure resistance to the composition. The fluorocarbon surfactant has an HLB value of about 18 and has been found to provide enhanced recovery of Kerogen from oil shale and hydrocarbon recovery from deeper hydrocarbon-containing formations.

The amount of the surfactant in the additive composition can be important to the effectiveness of the additive composition. Preferably, the additive composition contains at least about 2.5% by weight and more preferably from about 2.5% to about 10% by weight, and most preferably from about 2.5% to about 8% by weight of the surfactant.

The chelate can be any suitable chelate. Preferably, the chelate is a derivative of a carboxylic, phosphoric, or phosphonic acid. More preferably, the chelate is selected from the group consisting of EDTA, NTA, and other derivatives of a carboxylic acid, phosphoric acid, and phosphonic acid, such as poly(alkylphosphonic acid) (e.g. ACUSOL™ 505ND) and tripolyphosphates. The EDTA acid is preferably in the form of an alkali or alkaline earth metal salt, such as a sodium salt ("ETDA-$Na_4$") or a potassium salt, as the salt is more water soluble than the acid. The additive composition preferably includes at least about 2% by weight, more preferably an amount ranging from about 2% to about 8% by weight, and even more preferably an amount ranging from about 4% to about 6% by weight of the chelate, with the optimum amount being about 5% by weight.

In one formulation, the peroxygen composition, silicate, and chelate are salts having the same cation. More preferably, all of the salts in the additive composition have the same cation. The preferred cation is an alkali metal, such as sodium or potassium.

The ratios of the various components can be important parameters in many applications. Preferably, the weight ratio of the peroxygen composition to the chelate ranges from about 3:1 to 7:1 and more preferably is about 6:1. The preferred weight ratio of the metasilicate and sesquisilicate on the one hand to the surfactant on the other preferably ranges from about 5:1 to about 15:1 and most preferably are about 9:1. The preferred weight ratio of the metasilicate and sesquisilicate on the one hand to the peroxygen composition on the other preferably ranges from about 1:1 to about 2:1 and is more preferably about 1:1. The preferred weight ratio of the metasilicate and sesquisilicate on the one hand to the chelate on the other preferably ranges from about 5:1 to about 15:1 and most preferably are about 6:1.

The additive composition can also include a gelling agent to provide a gel formulation for applying the additive composition to accessible hydrocarbon deposits, such as hydrocarbon deposits on petroleum refinery equipment. The cleaning ability of the additive composition can be facilitated by the adherence properties of the gel. For instance, such gel formulations are particularly useful for hydrocarbon deposits on hydrocarbon carrying equipment, such as pipelines. Preferred gelling agents include carboxymethyl cellulose, hydroxymethylcellulose and modified polyacrylamide. The preferred concentration of the gelling agent in the additive composition ranges from about 6% to about 12% by weight.

To apply the additive composition with a gelling agent, the additive composition is preferably combined with from about 7 to about 14 parts by weight water and the mixture is placed in a pressurized vessel at about 160 psi. As the pressure is released, the mixture is ejected from the vessel onto the object to be cleaned. The mixture can include a foam builder such as Nonyl phenoxy polyethoxyethanol to enhance the foaming characteristics of the mixture. The above-noted components of the additive composition are combined by suitable techniques for forming granulated cleaners. For example, the various components are added to a vessel as follows: (i) the various builders are added first, preferably in an anhydrous form, and blended together, (ii) the surfactant is added second and blended with the builders, (iii) water is added after or simultaneously with the surfactants and blended with the surfactants and builders for a sufficient period of time for substantially all of the water to form hydrates with the builder(s), (iv) the silicate, chelate, and peroxygen composition are added in that order, and (v) the gelling agent, if used, is added last. The various components can be blended with any suitable device. In the preceding steps, the peroxygen composition is preferably maintained separate from water and the surfactant as the peroxygen composition will react with water and/or the surfactant, thereby releasing oxygen and neutralizing the peroxygen composition. Thus, the surfactant is preferably added to the vessel before the peroxygen composition.

The addition of water in the third step is preferably carefully controlled. If too much water is added, the resulting additive composition will not be a free flowing particulate, as desired, but will be a highly viscous mass. If too little water is added, the surfactant may not be immobilized and can react with the peroxygen composition. Preferably, the minimum amount of water added is the stoichiometric amount that is sufficient to form hydrates with substantially all of the hydratable builders and the maximum amount of water added is no more than about 150% and more preferably no more than about 125% of the stoichiometric amount. By way of example, if sodium carbonate ($Na_2CO_3$) is the hydratable builder the molar ratio of sodium carbonate to water preferably ranges from about 50:1 to about 175:1 and most preferably from about 100:1 to about 150:1. In most applications, the molar ratio of hydratable builders to water also ranges from about 50:1 to about 175:1 and more preferably from about 100:1 to about 150:1, and the total amount of water added to the additive composition in the third step and total amount of water in the additive composition, whether occurring as free or hydrated molecules, ranges from about 0.1 to about 0.5% by weight of the final additive composition, with 0.1% by weight being most preferred. The free moisture content of the additive composition is preferably no more than about 0.1% by weight of the additive composition.

The blending time of the third step is preferably carefully controlled to substantially minimize the amount of free water molecules present in the additive composition. The water/surfactant/builder blend is preferably blended for a sufficient period of time to allow the water to react with substantially all of the hydratable builders and for substantially all of the surfactant to form bonds with the hydrated builders. Preferably, the blending in the third step has a residency, also referred to as duration, of at least about 5 minutes after water addition and more preferably ranging from about 5 to about 10 minutes.

As noted above, the additive composition is preferably a dry, granular material. Before use, the additive composition can be dissolved in water, or other suitable carrier, to form a liquid additive composition. To ensure that the additive composition dissolves rapidly in cold or lukewarm water, the particle sizes of the various ingredients are that of a light density material. Light density materials have a large surface area allowing quicker solubility in cold or lukewarm water. Preferably, the additive composition has a mean particle size ranging from about 20 to about 100 mesh (Tyler), more preferably from about 30 to about 60 mesh (Tyler), and most preferably from about 30 to about 50 mesh (Tyler). The preferred concentration of the additive composition in the additive solution is discussed below. The liquid additive composition preferably has pH ranging from about pH 9 to about pH 13 and more preferably from about pH 11 to about pH 12.

The concentration of the additive composition in the additive solution depends upon the type of hydrocarbon deposit to be removed and the application technique. In most applications, the preferred aqueous concentration of the additive composition in the additive solution ranges from about 0.1 to about 8 and even more preferably from about 0.25 to about 5 percent by weight.

After blending with water or another solvent, the liquid additive composition commonly comprises at least about 0.1 wt. % and even more commonly from about 0.15 to about 0.8 wt. % of the peroxygen composition, commonly at least about 0.2 wt. % and even more commonly from about 0.3 to about 0.8 wt. % of the silicate, commonly at least about 0.01 wt. % and even more commonly from about 0.05 to about 0.08 wt. % of the builder, commonly at least about 0.002 wt. % and even more commonly from about 0.005 to about 0.008 wt. % of the surfactant, and commonly at least about 0.001 wt. % and even more commonly from about 0.001 to about 0.08 wt. % of the chelate.

Although an additive composition can be formulated in a manner of U.S. Pat. Nos. 6,043,207 and/or 6,194,367, the present invention is not limited to the composition of matter and/or the method of preparation taught therein.

Acid Over-Ride Procedure

In the use of the FRF composition, another opportunity developed, and that was the removal of barium scale form well bores and downhole safety valves, as well as the associated infrastructure in the producing systems that are subject to scale build-up. In the past a number of acids and solvents have been used with little success. Given two separate samples of barium scale one barium carbonate and the other barium sulfate and both collected from oil wells in the gulf of Mexico. Their deposits were shutting down an oil well because the SCSSV (surface controlled subsurface safety valve) could not be operated correctly. The inventors evaluated both scale samples in our laboratory and determined that one was a barium carbonate scale and the other was a barium sulfate scale. It is well known that hydrochloric acid will dissolve barium carbonate and that only sulfuric acid will dissolve barium sulfate. In the laboratory evaluation when these two acids were tried on their respective scales no substantial results were produced. After examining the scale under a magnifying glass it was noted that a fine paraffin film had formed over the scale and the scale was actually a series of rings, consisting of paraffin and hydrocarbons on one ring and a scale formation on the next ring. To break these rings up an acid over-ride technique was performed. Acid over-ride is a method in which an alkali is used first on a scale and allowed to remove as much organic material as possible, in this case the oil, asphaltenes, and paraffin. The alkali is not rinsed out as normally done, but is allowed to remain in and around the scale. The acid of choice is then introduced. The result is a very reactive acid base reaction producing heat at the molecular level as well as throughout the solution. This molecular reaction will fracture the mineral scale and put into solution.

Because two very reactive acids, sulfuric acid and hydrochloric acid, are used, they have been buffered so they will be less reactive and not damage the integrity of the piping and valves that are to be cleaned. The use of phosphoric acid to act as a buffer and fume depressant is also well known, but Phosphoric Acid is also being used to help in solubilising the scale and carrying it away. The Acid formulations were as follows:

| (Sulfuric Acid blend for Barium sulfate Scale) | |
| --- | --- |
| Sulfuric Acid (98%) | 50% |
| Phosphoric Acid (75%) | 10% |
| Water (ice) | 40% |
| Total | 100% |

| (Hydrochloric Acid Blend for Barium Carbonate scale) | |
| --- | --- |
| Hydrochloric Acid (22'Be) | 55% |
| Phosphoric Acid (75%) | 10% |
| Citric Acid (99%) | 3% |
| Water | 37% |
| Total | 100% |

The FRF is the same composition discussed herein as under the tiered blending method. The soak time for both scale samples were the same using the FRF the most effective concentrations ranged from 3% to 5% and the temperature was held at 140° F. for 3 hours. To the scale sample one of the above acid mixtures was introduced straight into the alkali solution. The end result after 3 hours of contact time is as follows:

1. The barium sulfate scale (black) developed white streaks in it and began to lose all molecular strength. The scale dissolved approximately 50% and the reaming flakes were easily broken up in the hand. The solutions had a very heavy hydrogen sulfide odor and the liquid portion was black in color.
2. The barium carbonate scale (tan) developed an instant green/yellow color indicating that Barium Chloride was being formed. It also developed a hydrogen sulfide smell. There was a large residue of sandy material after the 3 hours of acidifying. There was also an equally large amount of hard flakes. These flakes were introduced into the sulfuric acid material and they were dissolved completely within 2 hours.

In actual field trials this over-ride procedure has been implemented with great success in three separate wells. All of them cleaned and freed the SCSSV which operated within the parameters for this type of equipment. The normal frequency for treatment is twice due to the heavy build up of the barium scale present in and around these valves.

Tiered Blending

It has been noted that there is a drop off in performance of prior formulations of the FRF composition after 3 months in storage. This drop off in performance is attributable to the storage and weather conditions typical in the oil and gas industry. It is standard procedure to store all materials out in the elements where not only water tight packaging is needed, but the excessive summer heat had a detrimental effect on the products shelf life. It is also noted that the older formulation of the composition can be difficult to blend in a high humidity environment or when the outside temperatures are in excess of 90° F. Blends manufactured under these conditions can create a blender fire or decompose in the package within 24 hours. A new tiered blending procedure is disclosed herein to substantially reduce these manufacturing and storage problems experienced before. The inventors also discovered that when using the tiered blending procedure additional surfactant can be added to the blend where before there was a limit of 3% surfactant. Successful blends containing 4, 5 and 6% surfactant loads have been produced, allowing this peroxygen composition to perform under extreme conditions that up to now were impossible. By making a separate blend of just the builder comprising of any of the following soda ash, phosphate or metasilicate, by hydrating just one component of the builders rather that all of them at one time, the heat of hydration can be controlled allowing for a complete hydration without a latent heat buildup that has been identified as a substantial problem for maintaining a long shelf life. The preferred ratio of water to surfactant will ranges from 15% to 33.3% water to surfactant. It is preferred to mix all surfactants and water additions before hydrating the builder.

In another embodiment a method for mixing a surfactant-carbonate composition, "the composition" is disclosed. It has well documented as to the procedures around surfactant blending in dry powder formulation. In the past it has been difficult to exceed a surfactant concentration with more than 6% concentration. In the past when surfactant levels exceed 6% in a powder formulation in the presence of per-carbonates, the normal reaction is either a blender fire or the end product has an uncontrollable release of oxygen. There was a need to develop a procedure to exceed the 6% surfactant threshold not only for the blending of per-carbonate but for laundry detergent blending eliminating the need for an agglomerating tower.

In another particular embodiment, a method is disclosed that not only increases the surfactant loading of dry blend over the 6% level but to incorporate this procedure in the blending of 30 to 40% per-carbonate blends. The procedure consists of a two step process in which the excessive heat of hydration is dissipated and the excessive heat load that happens in the blender that normally imparts heat into the product and produces adverse reactions on the package. Using Soda Ash as the main carrier and using a stoichiometric ratio of water to surfactant, it is possible to produce a dry intermediate product that can safely be blended with per-carbonates.

In one experiment mixing the surfactant carbonate composition, using 50 pounds of Soda Ash (dense) the following amount of liquid was added 5.4 pounds of Bio-Terg PAS™-8S, 1.8 lbs of Pluronic™ L-61, and 1.9 lbs of Pluronic™ 25-R-2, 1.8 pound of Rodafac™ RA-610 and 1.8 pounds of water. The liquid product was pre-mixed and slowly added over the blender face. This produced a product with a heat rise of 12° C. allowing the blender to turn for 45 minutes with a temperature rise of only 4° C. This was repeated using twice the surfactant load the temperature rise and decrease was the same. When 25% of this pre-mix was blended into a formulation consisting of 30% per-carbonate, 30% sodium meta-silicate 7% EDTA-$Na_4$ and 8% sodium try-polyphosphate, the end result was a dry free flowing product that has no oxygen release and is stable in temperatures exceeding over 80° F. in 100% relative humidity.

Lab experiments have been performed using FRF crystals as a water clarifier on water samples obtained from industry. The produced water samples were laden with iron as well as a large amount of bio-mass. With the addition of 1% FRF to this produced water sample a flock that settled to the bottom within 30 minutes was produced. This is a non-adherent flock that has no affinity to glass or rock formations. The inventors were also able to clean up the pump parts that were coated in the iron ppt. coming out of the above produced water. It required a 1% solution in a 24 hour soak to remove all iron deposits inside and outside the pump parts. The inventors also tested the penetration power of the new FRF crystals composition described herein on a quart deposit containing oil. The FRF crystals took 3 hours at 130° F. to penetrate this formation. The inventors observed a definite color change as well as large chunks of this deposit breaking off. This is a very good indication that these new FRF crystals will outperform all previous FRF formulations. In another particular embodiment an initial soak of 2% solution FRF designed for remedial pipeline treatment is used and a final soak of 0.75% solution of FRF designed for remedial pipeline treatment is used.

In one illustration of another preferred embodiment, a tiered blending of the composition is provided. It has been well known that it is possible to hydrate anhydrous builders such as Soda Ash; Sodium Tripoly Phosphate with surfactants, however there has typically been a limit as to the amount of surfactant that can be added to a builder in the presence of a per-oxygen composition. In the past, the surfactant had to be substantially hydrated and the blend had to be under 100° F. if these two items were previously not accomplished the end result of the blend was a rapid decomposition of the final blend. It is also well known that if these types of blends were attempted in high humidity conditions above 50% relative humidity, the excessive humidity would interfere with the surfactant hydration process and cause the product to slowly decompose over a one month period.

The normal blending procedure for dry compositions the blender is charged with enough builders to cover the dashers and or have enough material so that a successful hydration will result without a dough like consistency, the consistency should be dry without the powder to have a tendency to create a ball when place under pressure. It has been well documented that if the blend has any tendency to create a ball under pressure will result in a rapid and complete decomposition of the final product after blending.

It is also well known that chelators such EDTA-$Na_4$ react adversely in the presence of high humidity when blend with a per-oxygen composition. The end result is a discharge of a heavy amine odor (fishy odor), indicating the decomposing of the product resulting in a short shelf live and a drop of in performance almost immediately after production.

To eliminate these production problems a new technique was developed. This technique uses the hydration capabilities of just one builder rather than relying on a number of them. The theory is that when a number of builders are hydrated at one time they compete for the moisture resulting in an incomplete hydration. The incomplete hydration has left small amounts of surfactant exposed to the atmosphere allowing it to pick up moisture from humidity. This moisture will then react with the per-oxygen, releasing oxygen and causing a chemical reaction with the EDTA-$Na_4$, releasing an amine causing the fishy odor. Once the fishy odor occurs, the chelation value of the product decreases thus decreasing the efficiency of the products performance. Soda Ash is the preferred builder to use, however potassium carbonate, potassium pyro-phosphate, sodium metasilicate, sodium sequac-arbonate, sodium try poly phosphate, and tri sodium phosphate can also be used.

By combining the percentages of the builder (in this example soda ash is used) and the surfactants, then recalculating them into a new "pre-blend percentage, then calculating an addition of water to be between 10 and 25% of the total liquid portion. These calculations are as follows:

| INGREDIENT | FORMULA A | FORMULA B | FORMULA C |
|---|---|---|---|
| SODA ASH | 23.50% | 22.00% | 20.00% |
| SODIUM METASILICATE | 30.00% | 30.00% | 30.00% |
| SODIUM TRYPOLY PHOSPHATE | 7.50% | 7.50% | 7.50% |
| EDTA-Na4 powder | 6.50% | 6.50% | 6.50% |
| Surfactant 1 | 1.5% | 1.50% | 1.5% |
| Surfactant 2 | 0.5% | 1.00% | 1.00% |
| Surfactant 3 | 0.5% | 0.50% | 1.00% |
| Surfactant 4 | 0.00% | 1.00% | 1.00% |
| Surfactant 5 | 0.00% | 0.00% | 1.50% |
| WATER | 0.00% | 0.00% | 0.00% |
| SODIUM PRE-CARBONATE | 30.00% | 30.00% | 30.00% |
| TOTAL | 100.00% | 100.00% | 100.00 |

Just taking the soda ash and surfactants and recalculating the percentages:

| INGREDIENT | OLD % "A" | NEW % "A" | OLD % "B" | NEW % "B" | OLD % "C" | NEW % "C" |
|---|---|---|---|---|---|---|
| Soda Ash | 23.50% | 88.20% | 22.00% | 82.21% | 20.00% | 73.00% |
| Surfactant 1 | 1.50% | 5.8 | 1.50% | 5.60% | 1.50% | 5.47% |
| Surfactant 2 | 0.50% | 1.90 | 1.00% | 3.74% | 1.00% | 3.65% |
| Surfactant 3 | 0.50% | 1.90 | 0.50% | 1.87% | 1.00% | 3.65% |
| Surfactant 4 | 0.00% | 0.00% | 1.00% | 3.74% | 1.00% | 3.65% |
| Surfactant 5 | 0.00% | 0.00% | 0.00% | 0.00% | 1.50% | 5.47% |
| Water | 0.00% | 2.20% | 0.00% | 2.84% | 0.00% | 5.11% |
| OLD TOTAL | 26.00% | | 26.00% | | 26.00% | |
| NEW TOTAL | | 100.00 | | 100.00% | | 100.00% |
| % WATER TO SURFACTANT | | 18.64% | | 15.96% | | 18.93% |

The finished blend of New "A", New "B" and New "C" would then become an ingredient and blended back into the respective formulations at a 26% level. In each of these blends the soda ash was the first component into the mixer. The surfactants and the water were blended separately by weight in a liquid mixer. The final mixture was then distributed across the blender face. The total time for the surfactant addition was 5 minutes. The mixture was allowed to blend for an additional 10 minutes to insure complete hydration.

The temperature in formulation "A" remix never exceeded 80° F., the temperature for formulation "B" did not exceeded 90° F. and the temperature for formulation "C" did not exceed 95°, however, formulation "C" required an additional 15 minutes of blending time. All of these pre blends were blended during thunder storms in an open-to-outside-conditions blending plant. All three formulations were set aside for 24 hours and checked for temperature rise and dryness. All three formulations returned to room temperature retaining no latent heat and were dry and free flowing. When the preblends were blended back into the total formulation at the 26% level there was no excessive gas formation, amine odor, or caking, all of which would have happened if blended using the normal blending procedures. It was also possible to go from the standard 2.5% surfactant load to a new level of 6% using the new tiered blending procedure.

In another particular non limiting illustrative embodiment, a method is disclosed for treating a deposit, wherein the deposit comprises a hydrophobic portion and may include inorganic portion, the method including but not limited to contacting the deposit with a treating material to form a treated deposit, the treating material comprising peroxygen and surfactant. In another nonlimiting illustrative embodiment the method for treating a deposit further includes but is not limited to contacting the treated deposit with an acid. In another nonlimiting illustrative embodiment, the treatment material further includes but is not limited to a silicate. In another embodiment of the method for treating a deposit the inorganic portion may be a metal salt. In another embodiment of the method for treating a deposit the metal salt is a metal sulfate. In another embodiment of the method for treating a deposit the metal sulfate may be calcium, barium sulfate, strontium sulfate. In another embodiment of the method for treating a deposit, the deposit is at least a portion of the inorganic portion and may be entrained within the hydrophobic portion. In another embodiment of the method for treating a deposit, the acid may selected from the group consisting of HCl, HBr, $HNO_3$, $H_2SO_4$, $H_3PO_4$, citric acid, oxalate acid, organic acid salts and mixtures of the foregoing.

In another particular non limiting illustrative embodiment, a method is disclosed for treating a substrate, wherein the substrate supports a deposit, the deposit including but not limited to a hydrophobic portion and may contain an inorganic portion, the method including but not limited to contacting the deposit with a treating material to form a treated deposit, the treating material including but not limited to peroxygen and surfactant. In another particular non limiting illustrative embodiment, the method for treating a substrate further includes but is not limited to contacting the treated deposit with an acid when inorganic deposits are present. In another particular embodiment for treating a substrate, the treatment material further includes but is not limited to a silicate. In another particular non limiting illustrative embodiment of the method for treating a substrate, the inorganic portion is a metal salt. In a particular non limiting illustrative embodiment of the method for treating a substrate, the metal salt is a metal sulfate. In a particular non limiting illustrative embodiment of the method for treating a substrate, the metal sulfate calcium, barium sulfate, strontium sulfate. In a particular non limiting illustrative embodiment of the method for treating a substrate, the deposit is at least a portion of the inorganic portion and may be entrained within the hydrophobic portion. In a particular non limiting illustrative embodiment of the method for treating a substrate the acid is one of HCl, HBr, $HNO_3$, $H_2SO_4$, $H_3PO_4$, citric acid, oxalate acid, organic acid salts, and mixtures of the foregoing.

In another particular non limiting illustrative embodiment, a method is disclosed for operating a subterranean well, the method including but not limited to introducing a treating material to the well, wherein the treating material comprising peroxygen and surfactant. In another particular non limiting illustrative embodiment of the method for operating a subterranean well, the treating material further includes but is not limited to an acid. In another particular non limiting illustrative embodiment of the method for operating a subterranean well, the method further include but is not limited to adding acid to the well after the addition of the treating material. In another particular non limiting illustrative embodiment of the method for operating a subterranean well, the subterranean well further includes but is not limited to a deposit, the deposit comprising a hydrophobic portion and can include an inorganic portion and wherein the deposit is in contact with the well, and the treating material is introduced sufficiently to contact the deposit.

In another particular non limiting illustrative embodiment, a method is disclosed for treating a tank having a deposit therein, the method including but not limited to introducing a treating material to the tank, wherein the treating material comprising peroxygen and surfactant. In another particular non limiting illustrative embodiment of the method for treating a tank, the method further includes but is not limited to the tank further comprises a deposit, the deposit comprising a hydrophobic portion and an inorganic portion and wherein the deposit is in contact with the tank, and the treating material is introduced sufficient to contact the deposit.

In another particular non limiting illustrative embodiment, a method is disclosed for treating a pipe having a deposit therein, the method further includes but not limited to introducing a treating material to the pipe, wherein the treating material comprising peroxygen and surfactant. In a particular non limiting illustrative embodiment of the method for treating a pipe the treating material further includes but is not limited to acid when an inorganic is involved. In a particular non limiting illustrative embodiment of the method for treating a pipe further includes but is not limited to adding acid to the pipe after the addition of the treating material. In a particular non limiting illustrative embodiment of the method for treating a pipe the pipe, the deposit includes but is not limited to a hydrophobic portion and an inorganic portion and wherein the deposit is in contact with the pipe, and the treating material is introduced sufficient to contact the deposit.

In a particular non limiting illustrative embodiment, a product is disclosed which includes but is not limited to a tank having a deposit therein and a treating material, wherein the treating material includes but is not limited to a peroxygen and surfactant. In another particular non limiting illustrative embodiment of the tank product, the treating material further includes but is not limited to an acid. In another particular non limiting illustrative embodiment of the tank product, the deposit further includes but is not limited to a hydrophobic portion and an inorganic portion and wherein the deposit is in contact with the tank, and the treating material is in contact the deposit.

In a particular non limiting illustrative embodiment, a product is disclosed wherein the product includes but is not limited to a pipe having a deposit therein and a treating material, wherein the treating material includes but is not limited to peroxygen and surfactant. In another particular non limiting illustrative embodiment of the pipe product, the treating material further includes but is not limited to an acid. In another particular non limiting illustrative embodiment of the pipe product, the deposit further includes but is not limited to a hydrophobic portion and an inorganic portion and wherein the deposit is in contact with the pipe, and the treating material is in contact the deposit.

In another particular non limiting illustrative embodiment, a product disclosed and the product including but in not limited to removing slick water gels from frack procedures. Wherein the treated material includes but is not limited to a gelling agent, peroxygen compound a de-watering surfactant and a silicate. In another particular non limiting illustrative embodiment the cleaning frack fluid is not gelled but still contained the silicate and the de-watering surfactant. In another particular embodiment, a n subterranean well is disclosed including but not limited to a well bore defined by the subterranean well; a deposit residing in the well bore; and a treating material residing in the well bore and in contact with the deposit. In another particular embodiment, a product is disclosed, the product including but not limited to a substrate having a deposit thereon; and a treating material, wherein the treating material comprises a peroxygen and surfactant in contact with the deposit.

Fracking (also often referred to as hydraulic fracturing or hydrofracking) is a process stimulation procedure used by the oil and gas industry. Fracking fluids are forced under pressure into a hydrocarbon bearing formation surrounding a wellbore drilled in the Earth. Once those fluids reach the fracture gradient of the surrounding rock formation, the rock parts and fluid continues to flow further from the well bore formed in the surrounding formation. The fluid continues to propagate the fracture, and eventually a proppant is added to the fluid stream in order to keep the fractures from naturally healing once the well bore pressure is released. Once the process is finished the now propped fractures provide conduits for fluids, which may also be gases, to flow to the well bore and be recovered.

Hydraulic fracturing involves two main types of fluid streams, slickwater and crosslinked gel. Both are water based, and it is most typical that freshwater is used as the base. Slickwater contains freshwater to which a friction reducing agent is added. The purpose of this is to decrease the amount of pipe friction as the fluid is pumped. This decreases the required surface pressure needed to perform the job. The lack of other additives to slickwater is thought to also help keep the fracturing fluid from damaging especially "tight" or impermeable formations. The crosslink gel system is typically fresh water to which has been added guar (a common food additive). The purpose of the guar in this case is to increase the viscosity of the fluid in order to allow it to carry more proppant, and to keep the proppant from settling as it enters the formation. Additional chemical additives may include hydrochloric acid (typically pumped before the job to clean up the formation), additional friction reducers, clay control, weighting agents, and gel breakers.

The embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

The invention claimed is:

1. A method for treating a deposit, wherein the deposit comprises a hydrophobic portion and an inorganic portion, the method comprising:
   contacting the deposit with a treating material to form a treated deposit, wherein the
   treating material comprises a peroxygen and a surfactant and wherein the deposit is first penetrated by the surfactant and then reacts with the peroxygen; and,
   forming a least a portion of the treated deposit into particles.

2. The method of claim 1, further comprising:
   contacting the treated deposit with an acid.

3. The method of claim 1, wheiein the treatment material further comprises a silicate.

4. The method of claim 1, wherein the inorganic portion is a metal salt.

5. The method of claim 4, wherein the metal salt is a metal sulfate.

6. The method of claim 4, wherein the metal sulfate is one of a calcium, barium sulfate and strontium sulfate.

7. The method of claim 1, wherein the deposit is at least a portion of the inorganic portion and is entrained within the hydrophobic portion.

8. The method of claim 2, wherein the acid is at least one of HCl, $HB_r$, $HNO_3$, $H_2SO_4$, $H_3PO_4$, citric acid, oxalate acid and organic acid salt.

9. The method of claim 1, wherein the deposit is supported by a substrate.

10. A method for operating a subterranean well defining a well bore with a deposit residing in the well bore wherein the deposit comprises an organic and inorganic portion, the method comprising:
    introducing a treating material into the well bore and into contact with the deposit in the
    well bore to form a treated deposit, wherein the treating material comprises peroxygen and surfactant and wherein the deposit is first penetrated by the surfactant and then reacts with the peroxygen; and,
    forming at least a portion of the treated deposit into particles.

11. The method of claim 10, wherein the treating material can further comprises acid.

12. The method of claim 10, the method further comprising adding acid to the well after the addition of the treating material.

13. The method of claim 10, wherein the subterranean well further comprises a deposit, the deposit comprising a hydrophobic portion and can include an inorganic portion and wherein the deposit is in contact with the well, and wherein the treating material is introduced sufficiently to contact the deposit.

14. A method for treating a tank having a deposit thereon, the method comprising:
   introducing a treating material into contact with the deposit to form a treated deposit, wherein the treating material comprises a peroxygen and a surfactant wherein the deposit is first penetrated by the surfactant and then reacts with the peroxygen; and,
   forming at least a portion of the treated deposit into particles.

15. The method of claim 14, wherein the tank further comprises a deposit, the deposit comprising a hydrophobic portion and an inorganic portion and wherein the deposit is in contact with the tank, and the treating material is introduced sufficiently to contact the deposit.

16. A method for treating a pipe having a deposit therein, the method comprising: introducing a treating material to the deposit to form a treated deposit, wherein the treating material comprising peroxygen and surfactant and wherein the deposit is first penetrated by the surfactant and then reacts with the peroxygen; and,
   forming at least a portion of the treated deposit into particles.

17. The method of claim 16, wherein the treating material further comprises acid and the deposit further comprises an inorganic portion.

18. The method of claim 16, the method further comprising:
   Adding acid to the pipe after the addition of the treating material.

* * * * *